(12) United States Patent
Huang

(10) Patent No.: US 8,913,886 B2
(45) Date of Patent: Dec. 16, 2014

(54) PHOTOGRAPHIC DEVICE

(71) Applicant: Vivotek Inc., New Taipei (TW)

(72) Inventor: Shang-Yu Huang, New Taipei (TW)

(73) Assignee: Vivotek, Inc., New Taipei (TW)

( * ) Notice: Subject to any disclaimer, the term of this patent is extended or adjusted under 35 U.S.C. 154(b) by 0 days.

(21) Appl. No.: 13/952,293

(22) Filed: Jul. 26, 2013

(65) Prior Publication Data

US 2014/0044427 A1 Feb. 13, 2014

(30) Foreign Application Priority Data

Aug. 10, 2012 (TW) .............................. 101215506 A

(51) Int. Cl.
*G03B 17/00* (2006.01)
*G03B 15/03* (2006.01)

(52) U.S. Cl.
CPC ..................................... *G03B 15/03* (2013.01)
USPC ......................................... 396/176; 396/427

(58) Field of Classification Search
CPC ....................................................... G03B 15/05
USPC .................................................. 396/176, 427
See application file for complete search history.

(56) References Cited

U.S. PATENT DOCUMENTS

| 8,362,712 | B1* | 1/2013 | Lebens et al. | 315/291 |
| 8,374,498 | B2* | 2/2013 | Pastore | 396/199 |
| 8,594,495 | B2* | 11/2013 | Yang | 396/199 |
| 2008/0122927 | A1* | 5/2008 | Konno et al. | 348/143 |
| 2012/0062878 | A1* | 3/2012 | Koshimura et al. | 356/244 |

\* cited by examiner

*Primary Examiner* — Clayton E Laballe
*Assistant Examiner* — Dennis Hancock
(74) *Attorney, Agent, or Firm* — Morris Manning & Martin LLP; Tim Tingkang Xia, Esq.

(57) ABSTRACT

A photographic device includes a base, a camera lens module, a circuit component and multiple light-emitting components. The base has an installation surface. The camera lens module is movably installed on the installation surface of the base. The circuit component is installed on the installation surface of the base. The light-emitting components are electronically disposed on the circuit component. At least two of the light emitting components have different optical axis directions.

17 Claims, 4 Drawing Sheets

PHOTOGRAPHIC DEVICE

CROSS-REFERENCE TO RELATED APPLICATIONS

This non-provisional application claims priority under 35 U.S.C. §119(a) on Patent Application No(s). 101215506 filed in Taiwan, R.O.C. on Aug. 10, 2012, the entire contents of which are hereby incorporated by reference.

BACKGROUND

1. Technical Field

The disclosure relates to an optical component, more particularly to a photographic device.

2. Related Art

Generally speaking, the surveillance cameras are widely applied in several areas. For example, the surveillance cameras can be installed in a factory, a store, a building, a gateway or a passage of a house, a place needed to be supervised, or a place that is off the beaten track. Thereby, the incident can be recorded as evidence or for the purpose of the investigation if needed. Hence, the surveillance cameras can threaten the criminals to prevent them from committing crimes so that public order can be improved.

The fixed dome camera with infrared light, which are available on the current market, has a problem that the built-in light plate thereof cannot cover the whole range of camera's shooting angle because the covering angle of the built-in light plate is too small. Additionally, the light plate is fixed inside the machine so that it cannot be rotated or be tilted. Instead, the light plate can only be used in a fixed angle, or be amended by an adjusting mechanism. As a result, in certain viewing angles, the effective light projection length may be insufficient, or light around the edge of the video may be too dark.

SUMMARY

A photographic device comprises a base, a camera lens module, a circuit component and a plurality of light-emitting components. The base has an installation surface. The camera lens module is movably installed on the installation surface of the base. The circuit component is installed on the installation surface of the base. The plurality of light-emitting components are electronically disposed on the circuit component. At least two of the plurality of light emitting components have different optical axis directions.

BRIEF DESCRIPTION OF THE DRAWINGS

The present disclosure will become more fully understood from the detailed description given herein below for illustration only, and thus does not limit the present disclosure, wherein.

DETAILED DESCRIPTION

Figure 1:
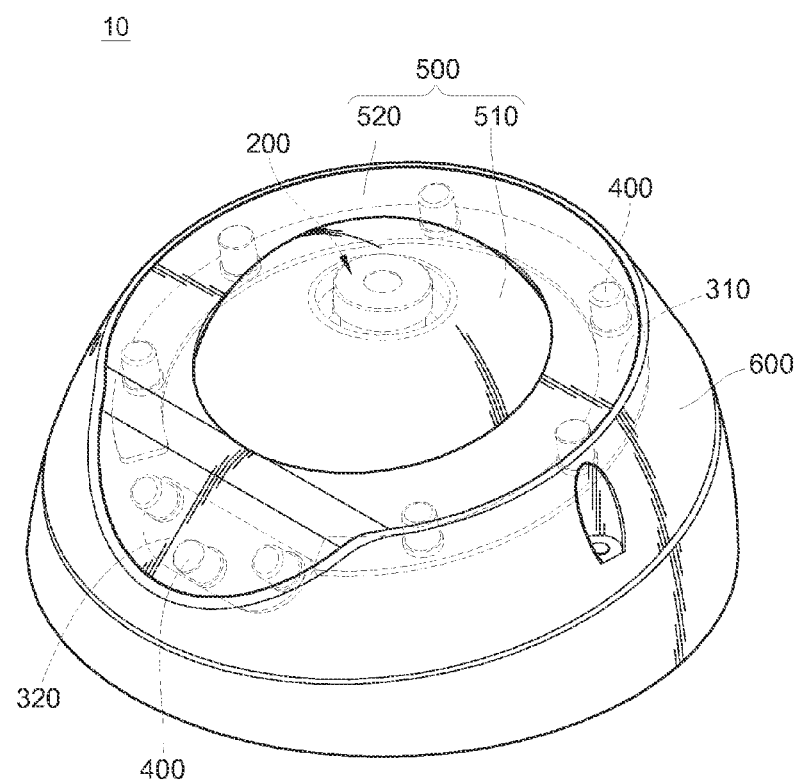
FIG. 1 is a perspective view of a photographic device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
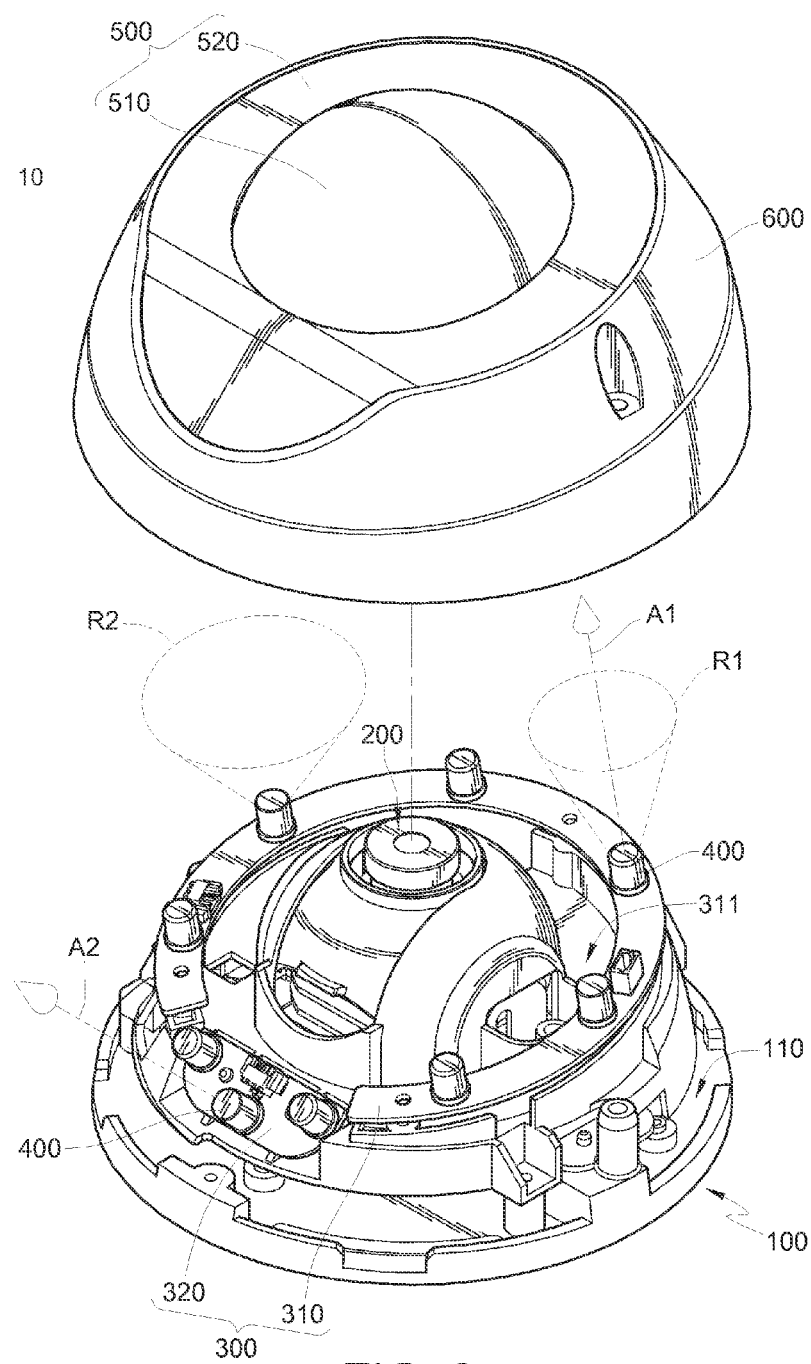
FIG. 2 is an exploded view of FIG. 1.
Figure 3:
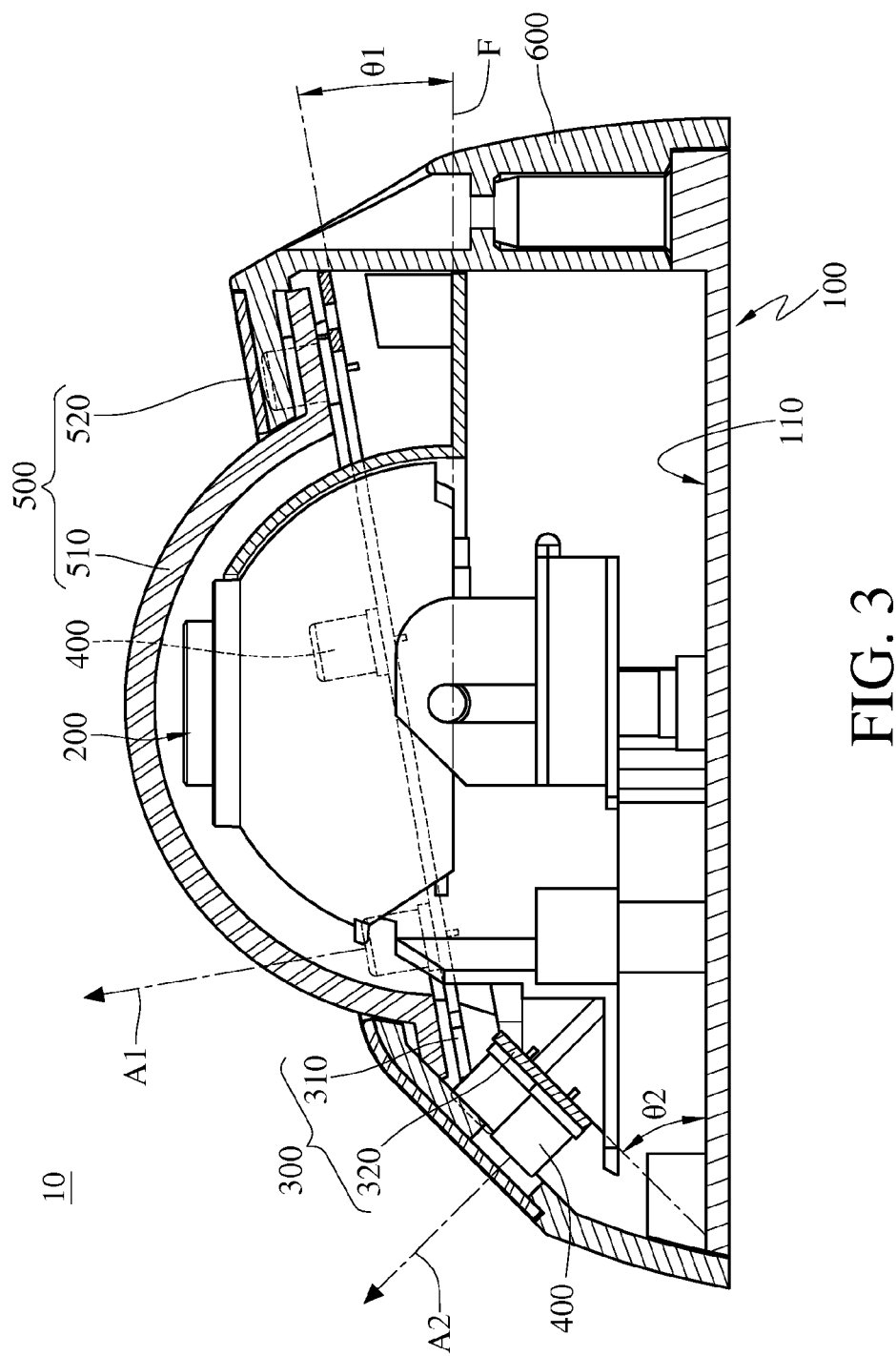
FIG. 3 is a sectional view of FIG. 1.

Referring to FIG. 1 to FIG. 3, FIG. 1 is a perspective view of a photographic device according to an embodiment of the disclosure. FIG. 2 is an exploded view of FIG. 1. FIG. 3 is a sectional view of FIG. 1

The photographic device 10 of this embodiment comprises a base 100, a camera lens module 200, a circuit component 300 and a plurality of light-emitting components 400. The base 100 has an installation surface 110. The camera lens module 200 is movably disposed on the installation surface 110 of the base 100. Specifically, the camera lens module 200 is pivotally disposed on the base 100 and is configured for rotating relative to the base 100, so as to make the camera lens module 200 have a first shooting position and a second shooting position. Thereby, the blind angle of the shooting range can be reduced.

In this embodiment, the camera lens 200 is a single lens. In other embodiments, however, the camera lens module 200 may be a component comprising lens and related elements (e.g., photosensitive element or sensing element).

The circuit component 300 is installed on the installation surface 110 of the base 100. The light-emitting components 400 are electronically disposed on the circuit component 300, so as to provide the illumination needed for the camera lens module 200 while shooting. In this embodiment, the light-emitting components 400 are infrared light-emitting diodes, so that the photographic device 10 is configured for night photography, but the disclosure is not limited thereto. In other embodiments, the light-emitting components 400 may be non-infrared light-emitting diodes. Furthermore, in this and some other embodiments, at least two of the light-emitting components 400 have different optical axis directions A1 and A2, so as to increase the overall brightness within the shooting range of the camera lens module 200. Thereby, the probability of occurrence of the dark corners within the shooting range is reduced, and thereby improving the photographic quality.

Specifically, the circuit component comprises a first circuit board 310 and a second circuit board 320. The first circuit board 310 and the second circuit board 320 are installed on the base 100 and are near the camera lens module 200. In this embodiment, the first circuit board 310 has an opening 311, and the camera lens 200 penetrates the opening 311, so as to make the first circuit board 310 surround the camera lens module 200. The second circuit board 320 is located on one side of the camera lens module 200, and the camera lens module 200 is configured for rotating in a direction towards the second circuit board 320 or away from the second circuit board 320. The light-emitting components 400 are electronically disposed on the first circuit board 310 and the second circuit board 320. The angle θ1 between the first circuit board 310 and the installation surface 110 (the angle θ1 in FIG. 3 is shown by an angle between the first circuit board 310 and a datum plane F parallel to the installation surface 110) is different from the angle θ2 between the second circuit board 320 and the installation surface 110, so as to make at least two of the light-emitting components 400 have different optical axis directions A1 and A2. Thereby, the light-emitting components 400 aim at different shooting areas. In this embodiment, the angle θ2 between the second circuit board 320 and the installation surface 110 is greater than the angle θ1 between the first circuit board 310 and the installation surface 110.

In this embodiment, the circuit component 300 is formed by two circuit boards, but this is not intended to limit the disclosure. In other embodiments, the circuit components 300 may be formed by more than two circuit boards.

In this and some other embodiments, at least two of the light-emitting components 400 have different projection angle range R1 and R2. The smaller the projection angle range of the light-emitting components 400 is (e.g., the projection angle range R1), the longer the effective irradiation distance is. On the other hand, the larger the projection angle range of the light-emitting components 400 is (e.g., the projection angle range R2), the evener the light emitted can be.

In this and some other embodiments, the photographic device 10 further comprises a diffuser 500 and a cover 600. The diffuser 500 is installed on the cover 600. The cover 600 is assembled to the base 100, so as to make the diffuser 500, the cover 600 and the base 100 together surround the camera lens module 200, the first circuit board 310, the second circuit board 320 and the light-emitting components 400. The diffuser 500 comprises a transparent shield 510 and a non-transparent shield 520. The transparent shield 510 is located above the camera lens module 200, while the non-transparent shield 520 is located above the light-emitting components 400. Moreover, the light emitted from the light-emitting components 400 penetrates the non-transparent shield 520. Specifically, the non-transparent shield 520 is disposed around the transparent shield 510, while the light-emitting components 400 surround the camera lens module 200. When the diffuser 500 covers the camera lens module 200 and the light-emitting components 400, the camera lens module 200 is configured for capturing the external image from the transparent shield 510. The light emitted from the light-emitting components 400 penetrates the non-transparent shield 520, so that the light-emitting components 400 are configured for providing the light source for photographic uses. Since the gap between the non-transparent shield 520 and the light-emitting components 400 is extremely small, the light from the light-emitting components 400 almost never goes to the transparent shield 510. Consequently, the photographic device 10 of this embodiment is capable of mitigating the problem that the light from the light-emitting components 400 is reflected from the transparent shield 510 to the camera lens module 200, and this improves the photographic quality.

Additionally, the non-transparent shield 520 can also be used for covering each of the circuit boards, the light-emitting components 400 and relevant wiring.

Furthermore, the diffuser 500 of this embodiment is divided into two parts, namely transparent shield 510 and a non-transparent shield 520, and this reduces the size of the transparent shield 510. As a result, the possibility of the transparent shield 510 being broken up is reduced.

Figure 4:
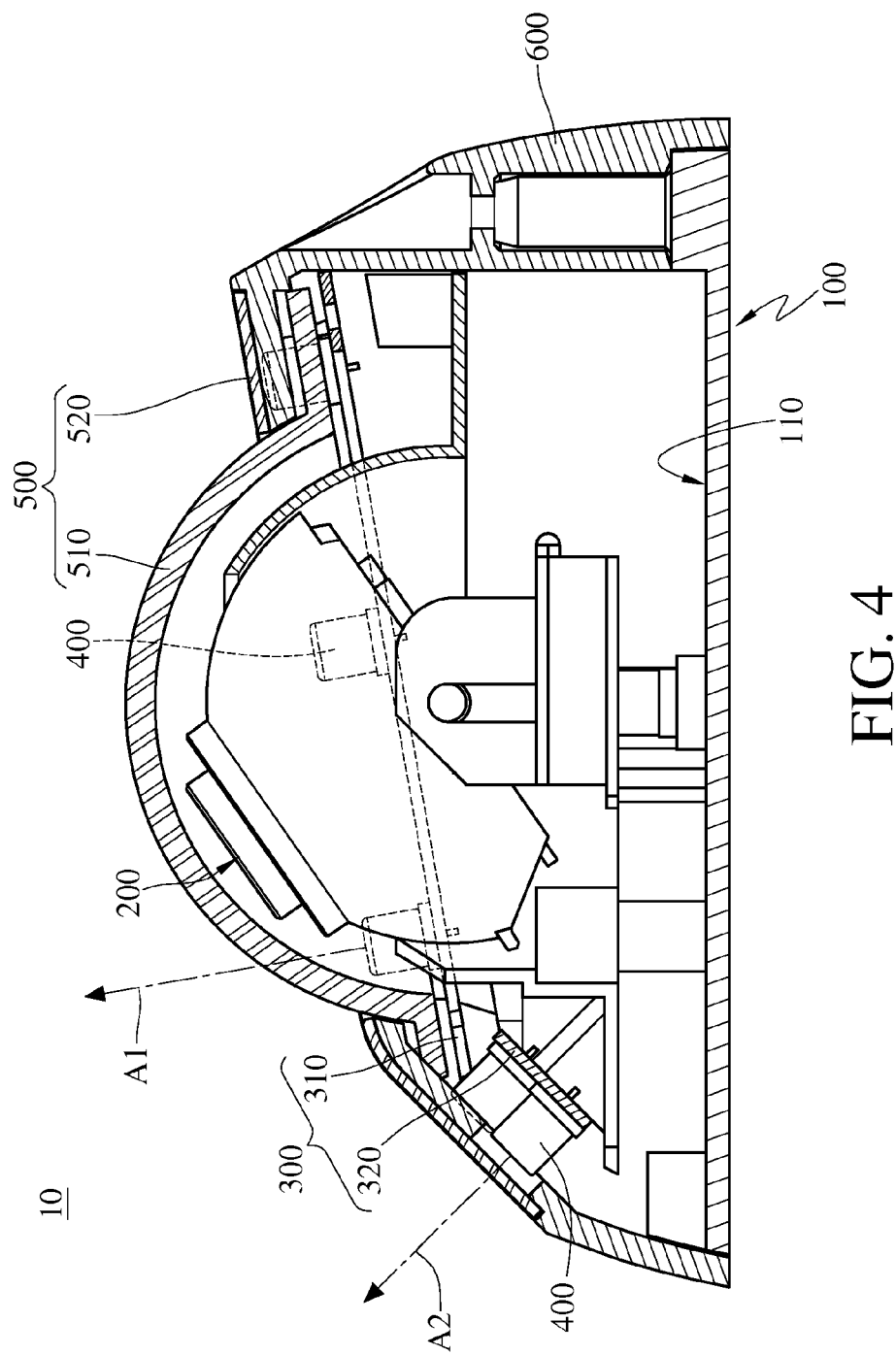
FIG. 4 is a sectional view of the photographic device moving to another shooting position.

Referring to FIG. 3 and FIG. 4, FIG. 4 is a sectional view of the photographic device moving to another shooting position. Overall, when the camera lens module 200 is at the first shooting position (as shown in FIG. 3), the camera lens module 200 is shooting in a direction opposite to the base 100. In addition, the light-emitting components 400 of the first circuit board 310 lighten the current shooting range of the camera lens module 200, so that there is sufficient brightness within the shooting range and this enables the photographic device 10 to have good photographic quality. Specifically, when the camera lens module 200 is at the first shooting position (as shown in FIG. 3), the camera lens module is shooting at the optical axis direction A1. In addition, the light-emitting components 400 of the first circuit board 310 lighten the current shooting range of the camera lens module 200, so that there is sufficient brightness within the shooting range and this enables the photographic device 10 to have good photographic quality. When the camera lens module 200 is at the second shooting position (as shown in FIG. 4), the camera lens module turns to shoot at the optical axis direction A2. Additionally, the light-emitting components 400 of the first circuit board 310 and the light-emitting components 400 of the second circuit board 320 lighten the current shooting range of the camera lens module 200, so that there is sufficient brightness within the shooting range and this enables the photographic device 10 to have good photographic quality.

In the photographic device according to above-mentioned embodiments, since the angle between the first circuit board and the installation surface is different from the angle between the second circuit board and the installation surface, the optical axis direction of the light-emitting components electronically disposed on the first circuit board is different from that of the light-emitting components electronically disposed on the second circuit board, so as to expand the illuminating range of the light-emitting components and create the optimized projection environment. Thus, when the camera lens module is adjusted to a different shooting range, the objects in the shooting range will be lightened by each of the light-emitting components. As a result, the objects in the shooting range can be imaged on the camera lens module clearly. Thereby, the photographic device is capable of acquiring good photographic quality.

Moreover, since the diffuser is divided into two parts, namely the transparent shield and the non-transparent shield, the camera is configured for capturing the external image through the transparent shield. In addition, the light emitted from each of the light-emitting components penetrates the non-transparent shield and lightens the objects in the shooting range to acquire good photographic quality. Thereby, the light from each of the light-emitting components is not reflected to the shooting range of the camera lens module by the transparent shield, and this improves the photographic quality of the photographic device.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A photographic device comprising:
   a base having an installation surface;
   a camera lens module movably installed on the installation surface of the base;
   a circuit component installed on the installation surface of the base, comprising a first circuit board and a second circuit board;
   a plurality of light-emitting components electronically disposed on the first circuit board and the second circuit board of the circuit component, wherein the angle between the first circuit board and the installation surface is different from the angle between the second circuit board and the installation surface, so as to make at least two of the plurality of light emitting components have different optical axis directions; and
   a diffuser disposed on the base,
   wherein the diffuser and the base surround the camera lens module, the first circuit board, the second circuit board and the plurality of light-emitting components; and
   wherein the diffuser comprises a transparent shield and a non-transparent shield, the transparent shield is located above the camera lens module, the non-transparent shield is located above the plurality of light-emitting components, and the light emitted from the plurality of light-emitting components penetrates the non-transparent shield.

2. The photographic device according to claim 1, wherein the angle between the first circuit board and the installation surface is greater than the angle between the second circuit board and the installation surface.

3. The photographic device according to claim 1, wherein the first circuit board and the second circuit board are near the camera lens module.

4. The photographic device according to claim 3, wherein the plurality of light-emitting components are near the camera lens module.

5. The photographic device according to claim 1, further comprising a cover, wherein the cover is installed in the base, the diffuser is installed on the cover to make the diffuser, the cover and the base together surround the camera lens module, the first circuit board, the second circuit board and the plurality of light-emitting components.

6. The photographic device according to claim 1, wherein the camera lens module is pivotally disposed on the base, the camera lens module is configured for rotating in a direction towards the second circuit board or away from the second circuit board.

7. The photographic device according to claim 1, wherein at least two of the plurality of light-emitting components have different projection angle range.

8. The photographic device according to claim 1, wherein each of the plurality of light-emitting components is infrared light-emitting diodes.

9. A photographic device comprising:
a base having an installation surface;
a camera lens module movably installed on the installation surface of the base;
a circuit component installed on the installation surface of the base, and comprising a first circuit board and a second circuit board; and
a plurality of light-emitting components electronically disposed on the circuit component, wherein at least two of the plurality of light-emitting components have different optical axis directions,
wherein the camera lens module is pivotally disposed on the base, such that the camera lens module is configured for rotating in a direction relative to the base towards the second circuit board or away from the second circuit board.

10. The photographic device according to claim 9, wherein the plurality of light-emitting components are electronically disposed on the first circuit board and the second circuit board, and the angle between the first circuit board and the installation surface is different from the angle between the second circuit board and the installation surface, so as to make at least two of the plurality of light-emitting components have different optical axis directions.

11. The photographic device according to claim 10, wherein the angle between the first circuit board and the installation surface is greater than the angle between the second circuit board and the installation surface.

12. The photographic device according to claim 10, wherein the first circuit board and the second circuit board are near the camera lens module.

13. The photographic device according to claim 12, wherein the plurality of light-emitting components are near the camera lens module.

14. The photographic device according to claim 9, further comprising a diffuser disposed on the base, so as to make the diffuser and the base surround the camera lens module, wherein the first circuit board, the second circuit board and the plurality of light-emitting components; the diffuser comprises a transparent shield and a non-transparent shield, the transparent shield is located above the camera lens module, while the non-transparent shield is located above the plurality of light-emitting components, and the light emitted from the plurality of light-emitting components penetrates the non-transparent shield.

15. The photographic device according to claim 14, further comprising a cover, the cover is installed in the base, wherein the diffuser is installed on the cover to make the diffuser, the cover and the base together surround the camera lens module, the first circuit board, the second circuit board and the plurality of light-emitting components.

16. The photographic device according to claim 9, wherein at least two of the plurality of light-emitting components have different projection angle range.

17. The photographic device according to claim 9, wherein each of the plurality of light-emitting components is infrared light-emitting diodes.

* * * * *